United States Patent
Traechtler

(10) Patent No.: US 7,826,953 B2
(45) Date of Patent: Nov. 2, 2010

(54) METHOD FOR ASSISTING THE DRIVER OF A MOTOR VEHICLE WITH A FISHTAILING TRAILER

(75) Inventor: Ansgar Traechtler, Borchen (DE)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 11/632,263

(22) PCT Filed: Jun. 3, 2005

(86) PCT No.: PCT/EP2005/052554

§ 371 (c)(1),
(2), (4) Date: Jan. 11, 2008

(87) PCT Pub. No.: WO2006/005652

PCT Pub. Date: Jan. 19, 2006

(65) Prior Publication Data

US 2008/0255741 A1    Oct. 16, 2008

(30) Foreign Application Priority Data

Jul. 10, 2004    (DE) ........................ 10 2004 033 474

(51) Int. Cl.
*G06F 19/00*    (2006.01)
(52) U.S. Cl. ............................ 701/70; 701/78; 701/83; 188/72.1

(58) Field of Classification Search ................... 701/70, 701/74, 78, 79, 83, 110, 36, 45; 303/122.1, 303/123, 124, 160; 180/170; 188/24.21, 188/72.1; 280/735
See application file for complete search history.

(56) References Cited

U.S. PATENT DOCUMENTS

| | | | |
|---|---|---|---|
| 3,908,782 A * | 9/1975 | Lang et al. | 188/112 A |
| 4,023,864 A * | 5/1977 | Lang et al. | 303/20 |
| 6,600,974 B1 | 7/2003 | Traechtler | |
| 2003/0122420 A1 * | 7/2003 | Tarabishy et al. | 303/191 |

FOREIGN PATENT DOCUMENTS

| | | |
|---|---|---|
| DE | 100 31 266 | 1/2001 |
| DE | 102 15 617 | 11/2003 |
| DE | 102 25 120 | 11/2003 |
| EP | 0 798 615 | 10/1997 |

* cited by examiner

*Primary Examiner*—Gertrude Arthur Jeanglaud
(74) *Attorney, Agent, or Firm*—Kenyon & Kenyon LLP

(57) ABSTRACT

The present invention relates to a method for assisting the driver of a motor vehicle with a fishtailing trailer. A vehicle with a fishtailing trailer can be stabilized in an especially rapid manner in that, in a first state, the fishtailing of the trailer is analyzed by evaluating at least one vehicle state variable, and when critical fishtailing is detected, a warning is output to the driver in a second state so as to induce the driver to brake, and the driver—provided he initiates braking—is assisted in the braking operation by automatic actuation of the vehicle brakes, a brake pressure being set at which the most optimal vehicle deceleration possible is achieved.

12 Claims, 2 Drawing Sheets

METHOD FOR ASSISTING THE DRIVER OF A MOTOR VEHICLE WITH A FISHTAILING TRAILER

FIELD OF THE INVENTION

The present invention relates to a method for assisting the driver of a motor vehicle with a fishtailing trailer and also to a corresponding device.

BACKGROUND INFORMATION

In a vehicle with trailer, excessive speed may cause fishtailing of the trailer about the vertical axis. Such fishtailing generally occurs only above a so-called critical speed, which is a function of the constructive properties and the loading of the trailer, in particular. The combination is instable above the critical speed.

From German Published Patent Application No. 100 31 266, it is known to detect fishtailing of the trailer by analyzing sensor data and to activate the vehicle or trailer brakes automatically, i.e., without involvement of the driver, in case of critical fishtailing of the trailer. The wheels of the vehicle or trailer may be braked both symmetrically (with equal force on the right and left) and also individually. Furthermore, it is known to dampen trailer fishtailing with the aid of automatic steering interventions in an active front or rear axle steering system. To detect the situation, a plurality of driving state variables such as the transverse acceleration or the yaw rate of the vehicle are normally analyzed in the process. In the mentioned methods a braking intervention is basically implemented whenever when a critical driving situation has been detected and a trailer is hooked up.

A particular problem in this context is the trailer detection. It is known, for instance, to detect a trailer by analyzing the electrical trailer connection. However, not all trailer types have an electrical connection and can be detected in this manner. Moreover, an electrical defect in the electrical system of the trailer could lead to a faulty detection. In this case the automatic stabilizing function would implement a braking operation even without a trailer being present, or it would not implement a braking operation although a trailer is hooked up.

SUMMARY OF THE INVENTION

It is the object of the present invention to assist the driver in stabilizing the vehicle in a critical driving situation while avoiding faulty braking interventions in the process.

An essential aspect of the present invention is that the braking intervention is not implemented immediately upon detection of a critical driving situation, but that instead the driver is merely informed that critical lurching of the vehicle trailer is occurring, thereby inducing the driver to brake. If the driver then initiates braking, the driver will be assisted in the braking operation in that a braking pressure is automatically set at the vehicle brakes by which a vehicle deceleration, in particular an optimal or the best possible optimal vehicle deceleration, is achieved in order to stabilize the trailer. If the brake actuation by the driver was not strong enough, for instance, the braking pressure is automatically increased to an optimal level as a function of the driving situation. On the other hand, if the brake pedal was actuated with too much force, the brake pressure will automatically be restricted. Such a method or a corresponding driver assistance system has the essential advantage that an automatic stabilization will be implemented only if braking has already been initiated by the driver. This prevents faulty braking interventions, especially if no trailer is hooked up to begin with.

The brake pressure adjusted in the stabilization phase is preferably a function of the driver initial pressure (i.e., the brake pressure exerted by the driver) and/or of the gradient of the driver initial pressure. In addition, the automatically adjusted brake pressure is preferably a function of the driving situation, in particular the vehicle velocity, the transverse acceleration and/or the yaw rate of the vehicle. In this way the stabilization intervention may be optimally adjusted to the driving situation and the driver wish.

This type of driver assistance may differ depending on the driving situation. In driving situations where the fishtailing of the trailer is non-critical, preferably no action will be taken. If the extent of fishtailing is within a predefined range, a warning, for instance, may be output to the driver and the driver be assisted in stabilizing the vehicle in case he/she initiates braking. If the stabilizing system detects heavy fishtailing of the trailer, automatic braking will preferably be initiated directly. A wrong reaction of the driver where, for example, the driver accelerates in order to stabilize the vehicle instead of braking forcefully, is prevented in this manner.

To detect fishtailing of the trailer, preferably the yaw rate and/or the transverse acceleration of the vehicle (taking the driver wish into account) are/is analyzed. Appropriate sensors are already factory-installed in conventional electronic stability programs and may be utilized by the driver assistance system.

The method of the present invention for assisting the driver and stabilizing the vehicle is preferably implemented only above a predefined velocity threshold.

A device for assisting the driver with a fishtailing trailer preferably includes a control device having a sensor system connected thereto for detecting a fishtailing movement of the trailer, a device for warning the driver, which is triggered by the control device as a function of the driving state, and also an active brake system. In the event that the driver initiates a braking operation because of the warning, the control device determines a setpoint brake pressure (or a proportional variable) by which a vehicle deceleration, in particular an optimal or the best possible optimal vehicle deceleration, is able to be achieved for the purpose of stabilizing the vehicle. The control device then adjusts this setpoint brake pressure by appropriate triggering of the active brake system such as the hydraulic unit of a vehicle's electronic stability program.

DETAILED DESCRIPTION

Figure 1:
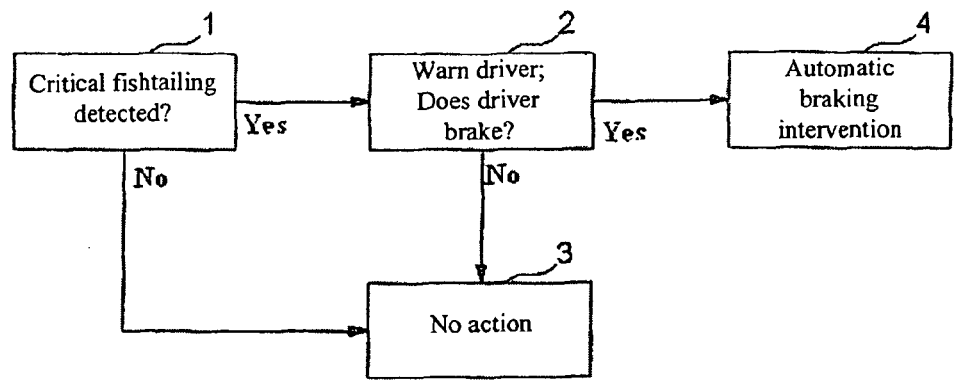
FIG. 1 shows a block diagram of the essential method states of a stabilizing method according to a first specific embodiment of the present invention.

FIG. 1 shows a schematic representation of the essential method states of a stabilizing method for assisting the driver with a fishtailing trailer. Block 1 represents the state of "situation detection", which is implemented by an appropriate electronic system such as a control device 13 (cf. FIG. 4). In the process, in particular signals that describe the lateralmotion dynamics of the vehicle such as the transverse acceleration or the yaw rate are processed and analyzed. The associated sensor system is denoted by reference numeral 12 in FIG. 4. The already installed ESP sensor system, for instance, may be used for situation detection. To detect whether a trailer is hitched to begin with, the electrical trailer connection may optionally be analyzed.

Critical trailer fishtailing is detected when the monitored driving state variables satisfy a predefined condition, for instance if the yaw rate or the vehicle transverse acceleration exceeds predefined threshold values. In this case the driver is optically or acoustically warned in block 2 and asked to initiate a braking operation. In the event that the monitored variables do not satisfy the predefined condition, no further action will be taken, and state 3 is assumed.

After the output of a driver warning in state 2, the driver may then decide himself whether or not he wishes to brake.

If the driver does not brake (case N), the method goes over to state 3 and no further action is taken. However, if the driver brakes (case Y), an automatic braking intervention will assist the driver in stabilizing the vehicle in state 4. The force of the automatic braking intervention is a function of the driving situation, in particular, i.e., the vehicle velocity and the degree of fishtailing, and preferably also of the force of the brake actuation (driver initial pressure) or the rise rate of the driver initial pressure.

Figure 2:
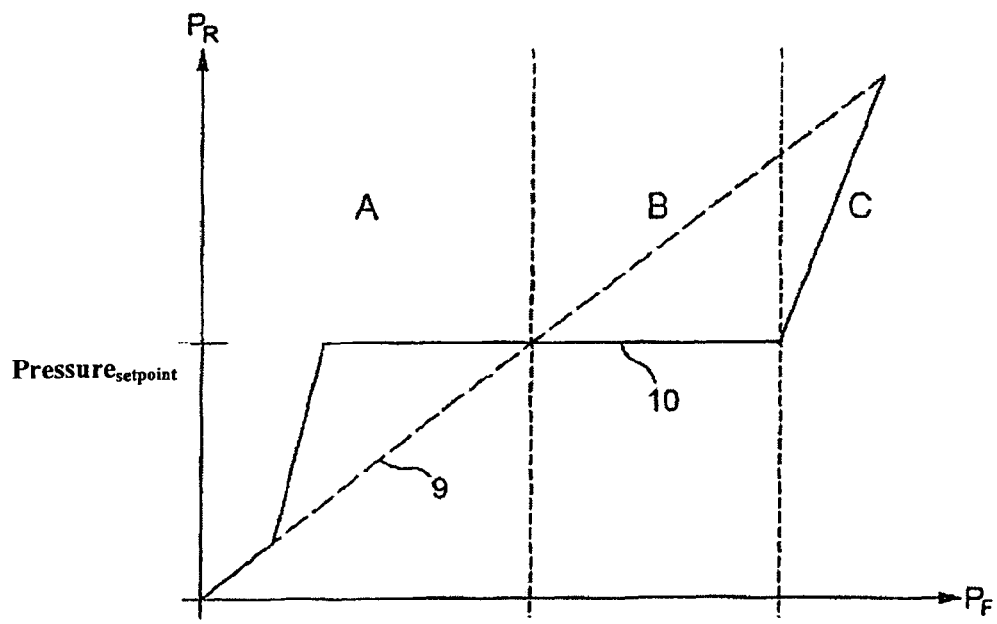
FIG. 2 shows the characteristic of the wheel-brake pressure as a function of the driver input.

By way of example and on the basis of curve 10, FIG. 2 illustrates a wheel-brake pressure $P_R$, adjusted at a wheel, for a predefined driving situation as a function of driver initial pressure $P_F$. In a first section of range A with very low initial pressures (the driver activates the brakes only very lightly), no automatic driver assistance is provided so that wheel-brake pressure PR corresponds to driver initial pressure $P_F$ (curve 9). With increasing initial pressure $P_F$, a setpoint brake pressure $p_{so}$ is then set at the wheel brakes by automatic triggering of hydraulic unit 15, the setpoint brake pressure having been calculated by control device 13 as a function of the situation. If the driver does not brake with enough force (range A), wheel-brake pressure $P_R$ will be increased correspondingly; however, if the driver brakes too forcefully (range B), wheel-brake pressure $P_R$ will be restricted to setpoint $p_{so}$. In the case of very high driver initial pressures $P_F$, it is preferred if no automatic restriction is implemented in order to allow the driver to overbrake the vehicle. In this range C, wheel-brake pressure $P_R$ (curve 10) once again corresponds to the driver wish (curve 9). However, other characteristic curves are conceivable as well; in particular, one or a plurality of regions A, B, C may also have width 0.

Figure 3:
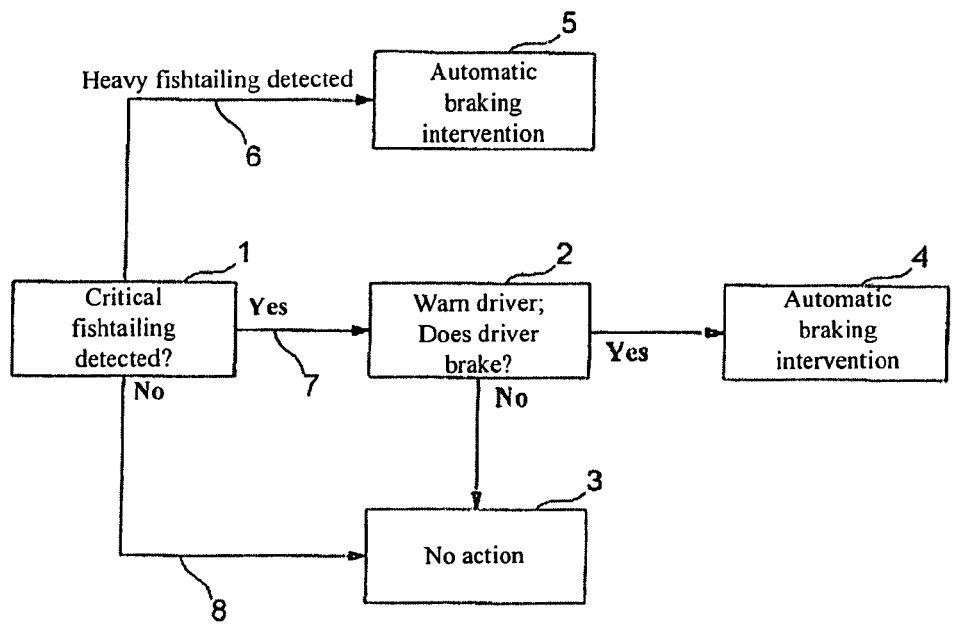
FIG. 3 shows a block diagram of the essential method states of a stabilizing method according to a second specific embodiment of the present invention.

FIG. 3 shows the essential method states of a method for assisting the driver with a fishtailing trailer according to another specific embodiment of the present invention.

States 1-4 correspond to states 1-4 of FIG. 1, so that, for the description, reference is made to the description in connection with FIG. 1. In contrast to the method of FIG. 1, different stabilizing measures are initiated here as a function of the intensity of the trailer fishtailing. If no fishtailing of the trailer is detected (situation detection) in state 1 (cf. arrow 8), no further action will be taken and the method transitions to state 3. With moderate fishtailing (arrow 7), the driver is once again given an optical or acoustic warning to induce the driver to brake. In the case of heavy fishtailing (arrow 6), however, the vehicle will be stabilized directly (state 5) via an automatic braking intervention, independently of any action by the driver. This automatic braking intervention 5 is in turn dependent on the driving situation (such as the vehicle velocity and the fishtailing intensity) and is under the control of control device 13.

Figure 4:
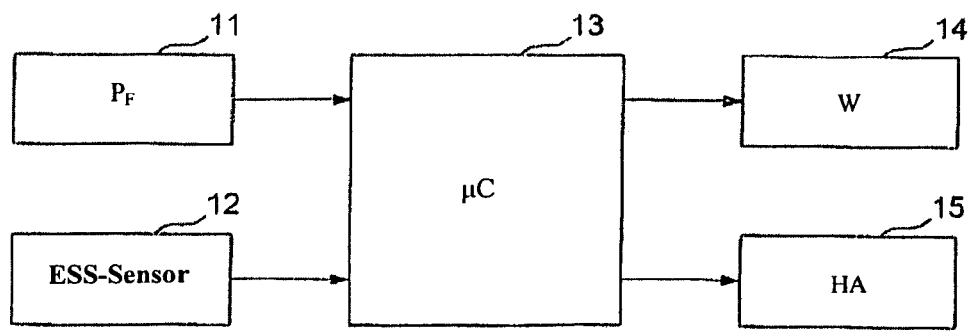
FIG. 4 shows a schematic representation of a device for assisting the driver with a fishtailing trailer.

FIG. 4 shows a block diagram of the essential elements of a device for stabilizing a vehicle with a fishtailing trailer. It includes a control device 13 with a sensor system 12 connected thereto, which detects a critical driving situation by analyzing the sensor signals. Sensor system 12 includes, for instance, a yaw rate sensor and/or a transverse acceleration sensor.

An optical or acoustic warning device 14, which may be activated by control device 13, is provided to warn the driver. An actuation of the brake by the driver is detected by a brake pedal sensor 11, which is likewise connected to control device 13. Control device 13 is also connected to an active brake system 10 such as a known ESP hydraulic unit, which, if desired, is able to be electrically triggered by control device 13 in order to assist the driver in stabilizing the vehicle. The control device includes an algorithm by which the afore-described method may be implemented.

LIST OF REFERENCE NUMERALS

1 Situation detection
2 Driver warning
3 No action
4 Driver assistance
5 Automatic braking intervention
6 Heavy fishtailing
7 Moderate fishtailing
8 No fishtailing
9 Wheel-brake pressure without assistance
10 Wheel-brake pressure with driver assistance
11 Brake pedal sensor
12 ESP sensor system
13 Control device
14 Display device
15 Hydraulic unit
A Low initial pressure
B Medium initial pressure
C High initial pressure
vFz Vehicle velocity
vGi Yaw rate
$a_y$ Transverse acceleration

What is claimed is:

1. A method for assisting a driver of a motor vehicle with a trailer that is fishtailing, comprising:
   detecting a fishtailing of the trailer by analyzing at least one driving state variable;
   outputting a warning to the driver upon detection of a critical fishtailing so as to induce the driver to brake;
   monitoring a brake actuation implemented by the driver; and
   assisting the driver in a braking operation by automatically actuating a vehicle brake, a brake pressure being exerted by which a vehicle deceleration is achieved for the purpose of stabilizing the trailer, wherein the assisting is conditioned upon the driver braking in response to the warning.

2. The method as recited in claim 1, further comprising:
   ascertaining the brake pressure automatically set to assist the driver as a function of at least one of a driver initial pressure and a gradient of the driver initial pressure.

3. The method as recited in claim 1, further comprising:
   ascertaining the brake pressure automatically set to assist the driver as a function of a driving situation corresponding to one of a vehicle velocity and an intensity of the trailer fishtailing.

4. The method as recited in claim 1, wherein no action is taken with respect to actuating the vehicle brake, after determining that one of the following conditions exists:
   the fishtailing of the trailer is not critical; and
   the driver does not brake in response to the warning.

5. The method as recited in claim 1, further comprising:
   analyzing at least one of a yaw rate of the vehicle and a transverse acceleration of the vehicle to detect the trailer fishtailing.

6. The method as recited in claim 1, wherein the method is implemented only above a predefined velocity threshold.

7. The method of claim 1, further comprising:
   after determining that the critical fishtailing exceeds a predetermined intensity that is above a threshold intensity associated with outputting the warning, immediately initiating automatic braking, regardless of whether the driver brakes.

8. A device for assisting a driver of a motor vehicle with a trailer that is fishtailing, comprising:
   a first sensor system for detecting the trailer fishtailing;
   a control device for analyzing at least one item of sensor information for the purpose of situation detection;
   a device for outputting a warning to the driver upon detection of a critical fishtailing so as to induce the driver to brake;
   a second sensor system for monitoring a brake actuation implemented by the driver; and
   an electrically triggerable brake system that is automatically actuated by the control device in such a way that a vehicle deceleration is achieved for the purpose of stabilizing the trailer, wherein the actuating by the control device is conditioned upon the driver braking in response to the warning.

9. The device as recited in claim 8, wherein the control device ascertains a brake pressure as a function of at least one of a driver initial pressure and a gradient of the driver initial pressure.

10. The device as recited in claim 8, wherein, within a range of medium driver initial pressure, a wheel-brake pressure is set to a predefined setpoint value, and corresponds to the driver initial pressure in very high driver initial pressures.

11. The device of claim 8, wherein no action is taken by the control device with respect to actuating the vehicle brake, after determining that one of the following conditions exists:
    the fishtailing of the trailer is not critical; and
    the driver does not brake in response to the warning.

12. The device of claim 8, wherein after determining that the critical fishtailing exceeds a predetermined intensity that is above a threshold intensity associated with outputting the warning, the control device immediately initiates automatic braking, regardless of whether the driver brakes.

* * * * *